July 5, 1960 H. C. KUNTZLEMAN 2,944,249

MAGNETIC STORAGE AND SWITCHING STRUCTURE

Filed Dec. 30, 1958

INVENTOR
HARRY C. KUNTZLEMAN

BY John P. Doritz
ATTORNEY 2,944,249

MAGNETIC STORAGE AND SWITCHING STRUCTURE

Harry C. Kuntzleman, Newark Valley, N.Y., assignor to International Business Machines Corporation, New York, N.Y., a corporation of New York Filed Dec. 30, 1958, Ser. No. 783,913

8 Claims. (Cl. 340—174)

This invention relates to magnetic core storage and switching devices and more particulary to such devices in which one of a plurality of values may be stored or switched.

In prior devices, magnetic cores have been used to store one of a plurality of values by driving the core to a particular level of magnetic retentivity and determining the value stored by resetting the core to a specified level of retentivity and discriminating the amplitude of the signal thus produced to determine the value stored. The preferred embodiment of the present invention contemplates the use of a single magnetic core encompassing a plurality of magnetic circuits which magnetic circuits are each capable of storing a signal by virtue of the retentivity of the individual magnetic circuits. In this manner, one of a plurality of values may be stored without resort to amplitude discrimination.

Accordingly, an object of this invention is to provide an improved magnetic storage and switching device.

Another object is to provide an improved magnetic core storage device capable of storing one of a plurality of values.

According to a preferred embodiment of the present invention, a single magnetic core structure contains two primary magnetic circuits magnetized in opposite directions. A plurality of secondary magnetic circuits are provided between the two primary circuits and when selectively energized reverse the magnetization in a portion of each of the two primary circuits. The several secondary circuits may each be assigned an arbitary value. The energization of a particular secondary circuit thus stores the value assigned thereto. An auxiliary magnetic circuit is provided in the core for each secondary circuit for sensing the state of magnetization of the secondary circuit associated therewith. The operation of the auxiliary circuits does not change the state of the secondary circuits, and thus the sensing of information in the core is nondestructive, and consequently the sensing of the information in the core may be repeated as often as desired without regeneration.

Another object of this invention is to provide an improved magnetic core storage device capable of storing one of a plurality of values and capable of being sensed without destroying the value stored.

Other objects of the invention will be pointed out in the following description and claims and illustrated in the accompanying drawings, which disclose, by way of examples, the principle of the invention and the best mode, which has been contemplated, of applying that principle.

Figure 1:
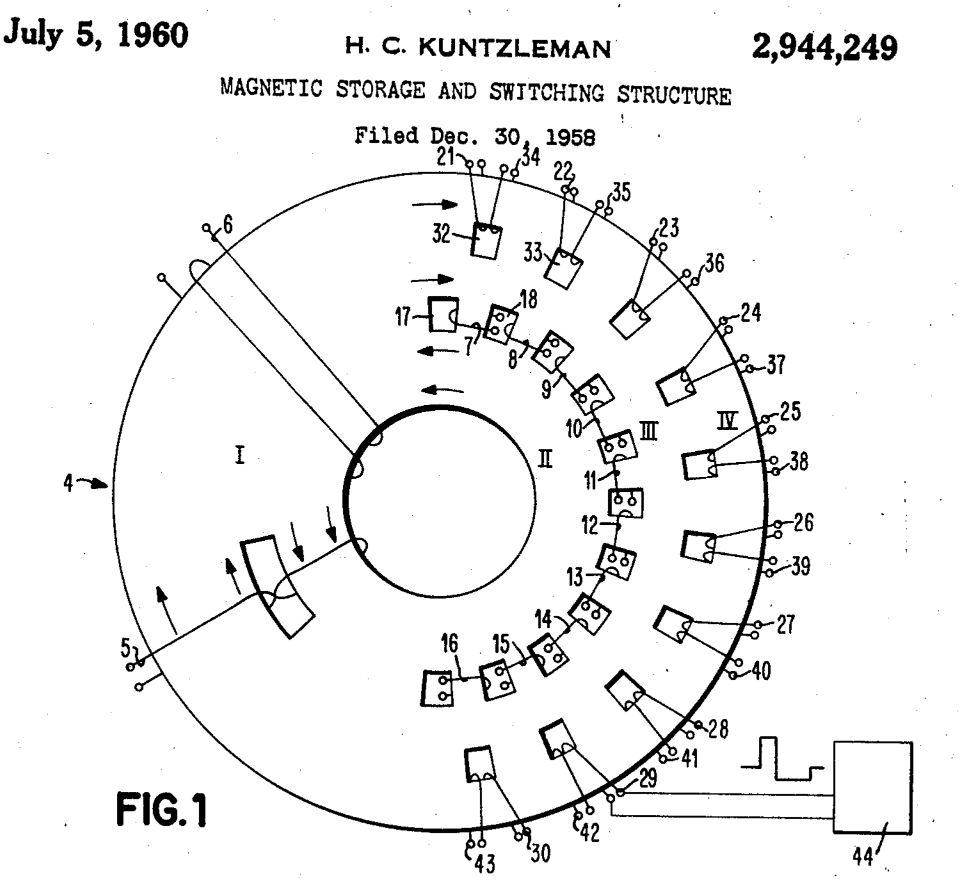
Fig. 1 is a schematic diagram of a core storage and switching structure constructed in accordance with the present invention.
Figure 2:
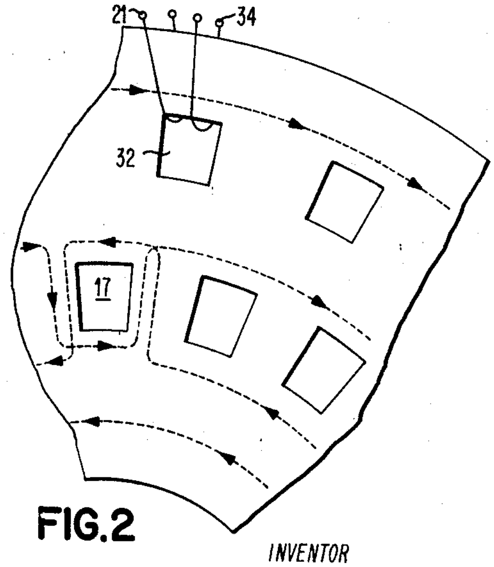
Fig. 2 is a portion of the core storage device shown in Fig. 1 with the lines of magnetic flux indicated for a value stored.

Referring to Fig. 1 there is shown a closed loop magnetic core 4 having substantial magnetic retentivity and a rectangular hysteresis loop. Materials of this type are well known and are commonly used as magnetic core storage elements. Core 4 has a figure eight type winding 5 threaded therethrough so that one half of the core may be saturated in one direction while the other half of the core is saturated in the opposite direction. This establishes two primary magnetic circuits in the core 4. Although a figure eight winding is shown, it may be desirable to provide two distinct windings, one for each half of the core with suitable driving means to produce the relatively large flux needed to saturate the two halves of the core in opposite directions. The arrows indicate the directions of magnetization produced by the winding 5 when energized by a current pulse passed therethrough. One of the two primary magnetic circuits extends around the outer half of the closed loop core and encompasses the areas designated III and IV, while the other primary magnetic circuit extends around the inner half of the closed loop and encompasses the area designated II. It should be noted that the cross-sectional area of leg I of the core should be equal to or greater than the sum of the cross-sectional areas of legs II, III and IV as indicated on the core in Fig. 1. In order to store a value in core 4, it is necessary that the winding 5 be pulsed to set the two primary circuits of the core into opposite states of magnetic retentivity as indicated above. If it is desirable to disable the core such that it may not be caused to store a value, the winding 6 may be impulsed simultaneously with the application of the pulse to winding 5 to thus prevent the two primary magnetic circuits assuming opposite states of magnetic retentivity. Secondary windings 7, 8, 9, 10, 11, 12, 13, 14, 15 and 16 are provided to respectively store the values arbitrarily chosen as one through ten. The secondary windings 7 through 16 cooperate with the core 4 to provide ten secondary magnetic circuits in core 4 disposed between the two primary magnetic circuits mentioned above. The secondary magnetic circuits of course overlap the primary magnetic circuits to some extent. As arbitrarily chosen, the secondary magnetic circuit around aperture 17 stores a decimal one when energized, the secondary magnetic circuit around aperture 18 stores a decimal two when energized, etc. Any of the windings 7 through 16 may be selectively chosen to store any of the ten decimal values. By selecting one of the windings 7 through 16 and applying a current pulse therethrough, the core area about the selected winding is magnetized in a particular way. For storing a one, for example, the winding 7 is energized and reverses the flux established by the figure eight winding in a portion of the two primary magnetic circuits. This is indicated in Fig. 2 by the dotted lines around aperture 17. It may be seen from Fig. 2 that the core retains remanent magnetization around aperture 17 and that this magnetization is the reverse of that established in the two primary magnetic circuits in that portion of the primary circuits common to the selected secondary magnetic circuit. Although the core structure as shown is adapted for storing values in the decimal system of notation, it will be apparent that the structure may be adapted for storing the various values in any system of notation by providing the required number of apertures and windings and by assigning the secondary magnetic circuits appropriately designated values. If it is desired to store a one, for example, in the core of Fig. 1, the winding 7 is supplied with a pulse which establishes lines of flux around aperture 17 as shown in Fig. 2. Since the core has substantial retentivity, these lines of flux will remain after the pulse on line 7 dies away.

An auxiliary magnetic circuit is provided for each of the secondary magnetic circuits to sense the state of the secondary magnetic circuit and thus determine the value stored. A plurality of windings, 21 through 30, are threaded through core 4, respectively adjacent the secondary magnetic circuits having windings 7 through 16. The secondary magnetic circuit around aperture 17, for example, has associated with it the auxiliary magnetic circuit around adjacent aperture 32. The secondary magnetic circuit around aperture 18 is associated with the auxiliary magnetic circuit around aperture 33, etc. With a value stored in the core as indicated in Fig. 2, the winding 21 of the auxiliary magnetic circuit around aperture 32 is energized or pulsed to sense the state of the secondary circuit. The auxiliary magnetic circuit around aperture 32 overlaps the secondary magnetic circuit surrounding aperture 17 associated with winding 7 and is utilized to sense the state of the secondary magnetic circuit surrounding aperture 17.

Figure 3:
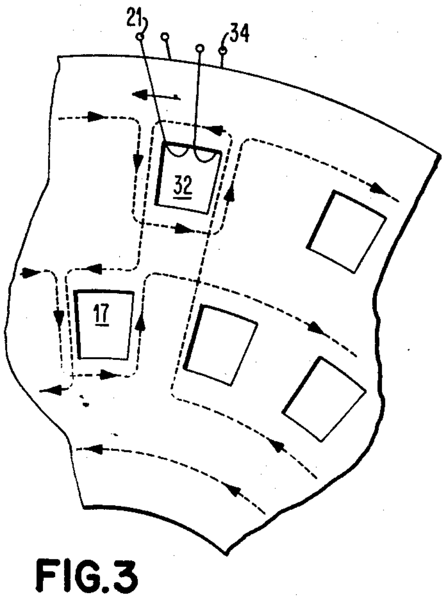
Fig. 3 is the same portion of Fig. 1 shown in Fig. 2 with the lines of magnetic flux indicated for sensing the value stored in the magnetic core.

In order to sense the core or read out the value stored therein, a current pulse is supplied through winding 21, for example. This current pulse induces a flux in core 4 in the direction indicated by the solid line arrow of Fig. 3. Current through winding 21 in cooperation with the secondary magnetic circuit around aperture 17 sets up flux paths around aperture 32 as shown by the dotted lines of Fig. 3. In response to the reversal of flux around aperture 32, an output winding 34 has a signal induced therein to indicate the fact that a value was stored by the secondary magnetic circuit surrounding aperture 17. If the line 7 has not been pulsed to store a value in the core about aperture 17, the lines of flux about apertures 17 and 32 will remain as shown by solid arrows in Fig. 1. If in this condition a pulse is applied through winding 21, the portion of the core about aperture 32 offers a low impedance to winding 21 and transfers little energy to winding 34. This results from the fact that a portion of the magnetic path about aperture 32 is in a state of retentivity of the same direction as the flux induced by a pulse through winding 21 regardless of the direction of the current pulse through winding 21. The portion of the magnetic path about aperture 32 having retained magnetic flux of the same direction as the induced flux acts in the same manner as an air gap might act and prevents a reversal of flux about aperture 32 to thus prevent any substantial output signal on winding 34 when winding 21 is pulsed. Output windings 34 through 43 are associated with the auxiliary magnetic circuits and may supply output signals to any desired utilization device.

A source 44 provides a sample or read out pulse to winding 29. Each of the windings 21 through 30 is provided with a like source, or if desired, all these winding may be driven by a common source with appropriate switching. The source 44 provides a positive going waveform followed by a negative going waveform as shown in Fig. 1. The positive going portion of the waveform senses the state of the associated secondary magnetic circuit, and the negative going portion returns the auxiliary circuit to the initial state. This operation leaves any secondary circuit in the same state that it had before sensing. Thus, the sensing of data in the secondary circuits is nondestructive and may be repeated as often as required without regeneration. With the arrangement shown, a single core structure is capable of storing any of the values in the decimal system of notation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention.

It is the intention, therefore, to be limited only as indicated by the scope of the following claims.

What is claimed is:

1. A storage device for storing one of a plurality of values comprising a magnetic core of a material having substantial retentivity and containing a pair of primary magnetic circuits, means for magnetizing said primary circuits in opposite directions, a plurality of secondary magnetic circuits disposed in said core between said primary circuits, means for energizing one of said secondary circuits to alter the direction of magnetization in a portion of each of said primary circuits and store the value assigned to the secondary circuit energized, and an auxiliary magnetic circuit associated with each of said secondary circuits for sensing the state of the associated secondary circuit.

2. A magnetic core structure for storing one of a plurality of values comprising a closed loop magnetic core of material having substantial rententivity, first and second primary magnetic circuits in said core, means for energizing said first circuit to magnetize a first portion of said core in a first direction, means for energizing said second circuit to magnetize a second portion of said core in a second opposite direction, a plurality of secondary magnetic circuits disposed between said primary circuits, means for energizing a selected one of said plurality of secondary circuits to alter the direction of magnetization in a portion of each of said primary circuits, and an auxiliary magnetic circuit assoicated with each of said secondary circuits for sensing the state of the associated secondary circuit.

3. A magnetic core structure for storing one of a plurality of values comprising a closed loop magnetic core of material having substantial rententivity, first and second primary magnetic circuits extending around the closed loop of said magnetic core, means for energizing said first circuit to magnetize a first loop of said core in a first direction, means for energizing said second circuit to magnetize a second loop of said core in a second opposite direction, a plurality of secondary magnetic circuits disposed between said first and said second loops, means for energizing a selected one of said plurality of secondary circuits to alter the direction of magnetization in a portion of said first and second loops of said core to store the value assigned to the selected secondary circuit, and an auxiliary magnetic circuit for each of said secondary circuits disposed in one of said loops of said core for sensing the state of the associated secondary circuits.

4. A magnetic core structure for storing one of a plurality of values comprising a closed loop magnetic core of material having substantial retentivity, first and second primary magnetic circuits extending around different portions of the closed loop of said magnetic core, means for energizing said first and second primary circuits in opposite directions to magnetize said different portions of the closed loop of said core in opposite directions, a plurality of secondary magnetic circuits disposed between said first and second primary magnetic circuits, means for selectively energizing said plurality of secondary circuits to reverse the direction of magnetization in a portion of said first and said second magnetic circuits adjacent the selected secondary circuit and store the value assigned to the selected secondary circuit, and an auxiliary magnetic circuit for each of said secondary circuits disposed in said core adjacent the associated secondary circuit for sensing the states of said secondary circuits to determine the value stored therein.

5. Apparatus according to claim 4 wherein said means for energizing said primary circuits comprises a winding threaded through said core in the form of a figure eight whereby current flowing through said winding magnetizes a first portion of the core in one direction and a second portion of the core in a second opposite direction.

6. Apparatus according to claim 4 wherein said means for selectively energizing said secondary circuits comprise windings threaded through said magnetic core between said different portions of the closed loop of said core.

7. Apparatus according to claim 4 wherein said auxiliary magnetic circuits include a sense winding threaded through said core adjacent each of said secondary magnetic circuits and an output winding threaded through said core adjacent each of said secondary magnetic circuits.

8. Apparatus according to claim 7 wherein said means for selectively energizing said secondary circuits comprise windings threaded through said magnetic core between said different portions of the closed loop of said core.

References Cited in the file of this patent

UNITED STATES PATENTS

| | | |
|---|---|---|
| 2,814,792 | Lamy | Nov. 26, 1957 |
| 2,898,581 | Post | Aug. 4, 1959 |

OTHER REFERENCES

IBM Technical Disclosure Bulletin, vol. No. 2, August 1958, "Flux Shifting Device," by Bauer and Butler (1 page).